United States Patent [19]

Jacobs, III et al.

[11] Patent Number: 4,939,213

[45] Date of Patent: Jul. 3, 1990

[54] TRIAZINE CROSSLINKING AGENTS AND CURABLE COMPOSITIONS CONTAINING THE SAME

[75] Inventors: William Jacobs, III, Bethel; Roland DiLeone, Rowayton, both of Conn.

[73] Assignee: American Cyanamid Company, Stamford, Conn.

[21] Appl. No.: 286,006

[22] Filed: Dec. 19, 1988

[51] Int. Cl.$^5$ .............................................. C08G 18/80
[52] U.S. Cl. .................................. 525/329.9; 528/45; 528/58; 528/73
[58] Field of Search ................ 525/329.9; 528/45, 58, 528/73

[56] References Cited

U.S. PATENT DOCUMENTS 4,322,332  3/1982  Hughs ................................. 528/73
4,696,991  9/1987  Kobayashi et al. ................. 528/45

*Primary Examiner*—Maurice J. Welsh
*Attorney, Agent, or Firm*—Roger S. Benjamin; William H. Calnan

[57] ABSTRACT

Novel triisocyanato triazines and carbamoyl triazine derivatives thereof are disclosed. These compounds will self-cure and also function as crosslinkers for compounds containing active hydrogen groups. When the active hydrogen-containing compounds are hydroxylated polymers, environmentally-resistant coatings are provided.

11 Claims, No Drawings

TRIAZINE CROSSLINKING AGENTS AND CURABLE COMPOSITIONS CONTAINING THE SAME

The present invention relates to curing agents, to curable compositions and to methods of making and using them. More particularly, the present invention relates to novel curing agents comprising triisocyanato triazines, tricarbamyl triazines and to curable compositions comprising an active hydrogen-containing material, such novel triazines and optionally, a cure catalyst. Coating cured from the compositions have exceptional environmental resistance, making them well adapted for use in various coatings applications, including, but not limited to powder coatings coil coatings and can coatings applications. The new compositions can also be used with filler to provide shaped articles of manufacture.

BACKGROUND OF THE INVENTION

It is known to use polyisocyanates and blocked polyisocyanates as crosslinkers to cure active hydrogen-containing compounds. Among these can be mentioned 1,6-hexamethylene diisocyanate and 2,4-tolylenediisocyanate, and the like. The isocyanate groups react with the active hydrogen compound to form urethane linkages, urea lingages, and the like. These isocyanates are frequently used and sold in the so-called blocked form, in which they have been pre-reacted, e.g., with phenol, or with another alcohol, or a beta diol, to form urethane compounds. When the curable compositions are prepared, they are generally stable at moderate temperature, but, after heating, they will de-block to yield the polyisocyanate and phenol or the respective alcohol, and then cure by reaction with the active hydrogen compound. In many cases the isocyanate equivalent weight of the crosslinker is relatively high because the compounds are difunctional and the blocking agents themselves have relatively high molecular weights. Moreover, aromatic polyisocyanates tend to form coatings which discolor on exposure to light. Aliphatic polyisocyanates on the other hand have superior resistance to degradation by light, but they are less reactive than aromatic isocyanates.

Mono- and diisocyanato-s-triazines have been reported (Ubrich van Gizycki, Angew Chem. Internat. Edit., Vol. 10 (1971), No. 6), having structures as follows:

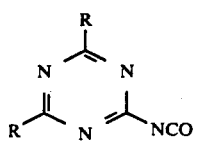

where R=Cl, F or CCl$_3$ and

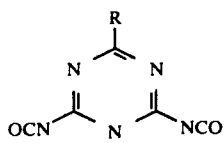

where R=Cl, CCL$_3$ or C$_6$H$_5$.

These compounds were prepared by reaction of the appropriate amino-s-triazine (0.1 mol.) with oxalyl chloride (0.3 to 0.5 mol per amino group) in anhydrous toluene or chlorobenzene (1-2 mol) or thiophane dioxide where R=F, the mixture being boiled at reflux until gas evolution is complete (7-8 hours). However, triisocyanato triazines have not been heretofore reported, to Applicants' knowledge.

It has now been discovered that melamine triisocyanate and derivatives thereof containing blocked isocyanate groups comprise a family of crosslinking agents with highly desirable properties. These compounds provide the light stability and superior environmental resistance of aliphatic isocyanates and their derivatives while at the same time retaining the superior reactivity and versatility of aromatic isocyanates and their derivatives. Accordingly, the compounds of the instant invention are seen to provide the combined advantages of both the aliphatic and aromatic isocyanates without the disadvantages heretofore associated with either. The triisocyanate derived from melamine, being tri-NCO functional and of relatively very low NCO equivalent weight (68) is an excellent crosslinker, producing urethane, urea, and other functionally cross-linked thermosetting systems. It is also a crosslinker for low temperature (room to slightly elevated temperature) curing thermosets, in the form of coatings, reactive injection moldings (RIMs), composites, adhesives, binders, etc., in its unblocked state. When blocked by reaction with alcohol, phenols, or other blocking agents, the new compounds are useful in one-component, heat cured systems.

SUMMARY OF THE INVENTION

According to the present invention, there are provided triazine compounds selected from:

(i) a triisocyanato triazine compound of the formula

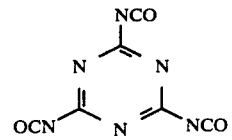

(hereinafter sometimes referred to by the formula "C$_3$N$_3$(NCO)$_3$" or by the name "melamine triisocyanate")

(ii) a tricarbamoyl triazine compound of the formula

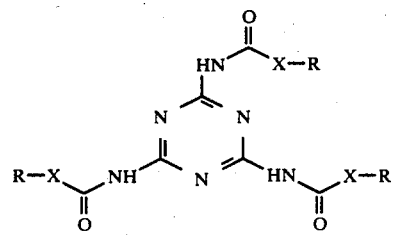

wherein the X-R moities are, independently, blocking groups (hereinafter sometimes referred to by the name "tricarbamoyl triazine" or by the formula "C$_3$N$_3$(NHCOXR)$_3$");

(iii) an oligomer of (i) or (ii) achieved through (a) self-condensation or condensation with one or more polyfunctional active hydrogen-containing materials when the triazine is melamine triisocyanate, or (b) self-condensation only when the triazine is $C_3N_3(NHCOXR)_3$, the terms "oligomer of (i)" and "oligomer of (ii)" hereinafter referring to these respective condensation products; and (iv) a mixture of at least two of any of (i), (ii) and (iii), wherein the X-R moieties are, independently, blocking groups.

In preferred embodiments of the invention for $C_3N_3(NHCOXR)_3$, X is nitrogen, oxygen, sulfur, phosphorus or carbon and R is lower alkyl, preferably $C_1$-$C_8$ and especially methyl, ethyl, n-propyl, i-propyl, butyl, n-octyl, 2-ethylhexyl, or a mixture of any of the foregoing. Most preferably, X is oxygen or carbon.

Also contemplated by the present invention are curable compositions comprising:

(a) a triazine compound selected from:
  (i) a triisocyanato triazine compound of the formula $C_3N_3(NCO)_3$;
  (ii) a tricarbamoyl triazine compound of the formula $C_3N_3(NHCOR)_3$;
  (iii) an oligomer of (i) or (ii) achieved through (A) self-condensation or condensation with one or more poly-functional active hydrogen-containing materials when the triazine is melamine triisocyanate, or (B) self-condensation only when the triazine is $C_3N_3(NHCOXR)_3$; or
  (iv) a mixture of at least two of any of (i), (ii) and (iii), wherein the X-R moieties are, independently, blocking groups; and optionally,
(b) an active hydrogen-containing material; and further optionally
(c) a cure catalyst.

In preferred features of this aspect of the invention, the active-hydrogen containing material (b) is a polymeric material containing at least two reactive carboxyl, alcoholic hydroxy, amide or amine groups, or a mixture of such groups, or a group convertible to such groups, preferably a hydroxy-functional acrylic resin, a low molecular weight polyester polyol, or an alkylene polyamine. Preferably the triazine will be as set forth specifically above, and the cure catalyst will be a metal salt or metal complex comprising tin, especially preferably tetrabutyldiacetoxy stannoxane.

Alternatively, the triazines can be used as self-crosslinkable materials (i.e., will selfcure) to provide protective and/or decorative coatings. Utilizing melamine triisocyanate as an example only, self-condensation thereof would, for example, produce a tetramer of the isocyanurate structure:

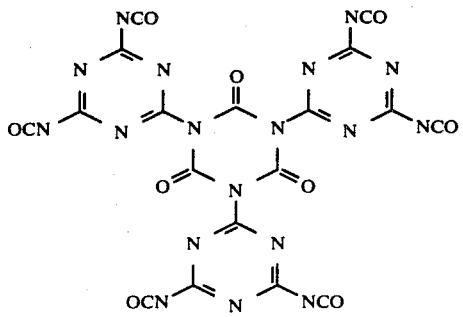

Greater or lesser degrees of self-condensation will, obviously, lead to higher or lower oligomers, but the basic structure thereof will be as described.

Also provided by the invention are articles of manufacture comprising substrates protectively coated with a cured composition as defined above and articles of manufacture comprising a cured composition as defined above and a filler, e.g., glass, e.g., glass powder, glass beads, glass fibers or foundry sand.

Further contemplated by the present invention is a process for making melamine triisocyanate which surprisingly utilizes an aprotic solvent in which it is known melamine is insoluble. (See, e.g. The Chemistry of Heterocyclic Compounds, Arnold Weisberger, Editor).

The process for production of the melamine triisocyanate compound of the present invention is preferably carried out by the reaction, in a suitable reaction vessel, of melamine and oxalyl chloride, in a suitable solvent. Preferably, a solvent is employed, although the reaction may be conducted using excess oxalyl chloride as solvent.

In the process aspect of the instant invention, the organic solvent suitable for carrying out the desired reaction is most broadly described as an aprotic polar compound, such as, for example, dioxane, or mixture of such compounds. Illustrative other aprotic polar solvents include halogenated hydrocarbons and aromatic hydrocarbons, such as nitrobenzene, o-dichlorobenzene, chlorobenzene, toluene, tetrahydrofuran and the like, or mixtures of these. Especially preferred solvents are nitrobenzene and o-dichlorobenzene. As stated above it has surprisingly been found that these aprotic solvents will dissolve the melamine and oxalyl chloride reactants in view of melamine's known insolubility therein.

The reactants may generally be mixed in varying amounts, however at least 1 mole of oxalyl chloride per 1 mole of triazino-amine group is generally required, and about 10 moles oxalylchloride per mole of melamine is preferred. While even larger excesses of oxalyl chloride may be used, very large excesses would not be viewed as practical or economical.

The reactants may be admixed in the solvent conveniently at room temperature, but it has been found to advantageously hasten the reaction to reflux the reactants, at or above atmospheric pressure.

The product of the reaction can be recovered by extraction of the excess oxalyl chloride, and solvent, e.g., benzene, if used. Further purification of the recovered product can be achieved by any conventional method, such as distillation, and the distilled oxalyl chloride may be recycled.

Extraction or distillation of the excess oxalyl chloride and solvent, if used, may be achieved by the use of vacuum and elevated temperatures. The oxalyl chloride may be distilled off and recovered, for example, under slight vacuum at temperatures of 50–100° C., while removal of, e.g., nitrobenzene solvent can be achieved at greater vacuum and temperatures of 100–180° C. Other methods of removing the excess oxalyl chloride and solvent are well known to those skilled in the art and need not be detailed here.

Derivatives of the melamine triisocyanate products of the present invention may be obtained by conversion to the corresponding tricarbamoyl triazine by reaction of the melamine triisocyanate with the corresponding blocking agent, as is known in the art, such as, for example, an alcohol or phenol. The reaction is generally exothermic, so it is preferred to admix the melamine triisocyanate and blocking agent reactants at temperatures no higher than about 80° C., and preferably below about 50° C. Conveniently, most times the reactants can be admixed at room temperture.

The substituents defined by X-R in the formula $C_3N_3(NHCOXR)_3$ above can vary widely in carbon and/or heteroatom content, and the groups can be straight chain, branched chain, alicyclic and/or aromatic. A number of representative substituents will be exemplified in detail hereinafter, it being understood, however, that any suitable blocking agent may be used to provide the correspondingly desired blocking group.

For example, the blocking agent may comprise a lower (e.g., $C_1$-$C_{12}$) aliphatic alcohol, such as methyl, ethyl, chloroethyl, propyl, butyl, amyl, hexyl, octyl, nonyl, 3,3,5-trimethylhexyl, decyl and lauryl alcohols and the like, a cycloaliphatic alcohol such as cyclopentanol and cyclohexanol, an aromatic alcohol such as benzyl alcohol, a phenol, such as phenol, o-, m- and p-cresol, p-chlorophenol, beta naphthol and the like, or a polyol such as ethylene glycol, propylene glycol, diethylene glycol, and the like.

The blocking agent may also comprise other blocking groups which deblock at relatively low temperatures, e.g., below about 125° C., such as an oxime of an aldehyde or ketone (e.g., methylethylketoxime, acetone oxime and cyclohexanone oxime), lactam (e.g., caprolactam), hydroxamic acid ester, imidazole, pyrazole, N-hydroxyimide (e.g., N-hydroxyphthalimide), oxazole, isoxazole, or other blocking groups such as those recited in U.S. Pat. No. 4,444,954, the pertinent portion(s) of which is hereby incorporated herein by reference.

In preparing the tricarbamoyl triazine compounds of this invention, the triisocyanato triazine and the blocking agent are typically reacted in such a way that relatively little, e.g., less then 5 mol percent of free isocyanate groups are present in the resultant product. Preferably, they are reacted in such a proportion that the equivalent ratio of the blocking groups of the blocking agent to that of the free —NCO groups of the isocyanate is not more than about 2 to 1, and preferably not more than about 1.5 to 1, it being understood that a ratio of at least about 1 to 1 is preferred to ensure a complete reaction to produce a suitable product.

To obtain the tricarbamoyl triazine compound, it is preferred that the isocyanate be added to the blocking agent when the blocking agent is polyfunctional. However, when the blocking agent is monofunctional, the order of addition has been found to be of no significance. Upon completion of the addition, the reaction mixture can simply be allowed to stand until the reaction is complete, e.g., for about 24 to 72 hours at room temperature, or it can be heated to accelerate the reaction, e.g., to a temperature in the range of from about 80° C. to 150° C., depending upon the character of the blocking agent as is well-known to those skilled in the art. Aprotic solvents, such as ketones, e.g., methyl isobutyl ketone, ethers, such as diethyl ether of ethylene glycol, or esters, such as ethyl acetate, may be employed if desired. The blocking agent reactant may also be used as solvent. The completion of the reaction can be followed in any convenient manner. For example, the disappearance of —NCO groups and the appearance of carbamoyl groups can be followed by infrared measurements. The products may be isolated in any convenient manner, e.g., by distillation of any solvent, followed by distillation of the residue under vacuum and recrystallization for purification.

In another aspect of the instant invention, curable compositions comprising the triisocyanato triazine, the tricarbamoyl triazine, an oligomer of either, or a mixture of any of these, and optionally an active hydrogen-containing material, preferably a polymer, and further optionally a catalyst, are provided.

The active hydrogen-containing materials suitable for use in the curable compositions of the instant invention typically have as the active hydrogen moiety a group selected from the group consisting of carboxyl, alcoholic hydroxyl, amido, primary amine, secondary amine (including imine), thiol and the like. The active hydrogen-containing materials useful herein are typically film-forming compositions, which form polymeric backbones in the resultant cured compositions. Illustrative examples of active hydrogen-containing materials are shown in the above-mentioned Koral patent and in U.S. Pat. No. 4,435,559. Typical such materials are acrylic polymers, polyesters, epoxy resins, alkylene polyamines, such as hexamethylene diamine, and the like.

Especially suitable active hydrogen containing materials include polyesters and polyacrylates containing pendant hydroxyl groups as reaction sites. The former are obtained in a known manner by, for example, the reaction of polycarboxylic acids with excess quantities of polyhydric alcohols; the latter are obtained by the copolymerization of acrylic or methacrylic acid derivatives with hydroxyl group-containing derivatives of these acids, such as, for example, the hydroxyalkyl esters, optionally with the simultaneous use of additional vinyl compounds, such as, for example, styrene. Hydroxyl group-containing polyurethanes can be obtained in a known manner by the reaction of polyisocyanates with excess quantities of compounds containing at least two hydroxy groups. Suitable commercially available hydroxy-group-containing polyesters are CYPLEX® 1531 a polyester of phthalic acid, adipic acid, ethanediol, and trimethylolpropane from American Cyanamid Company, Cargil Polyester 5776 available from Cargil and TONE® 0200 available from Union Carbide Corp. Suitable hydroxy functional acrylic resins are available commercially from S. C. Johnson & Son, Inc. under the trademark JONCRYL® -500, a copolymer of 50% styrene, 20% hydroxypropyl methacrylate and 30% butyl acrylate, and from Rohm & Haas Co. under the trademark AT-400. Also suitable for use are hydroxy-terminated polycaprolactones.

As set forth herein, the curable composition optionally also includes a cure catalyst. As is recognized by those skilled in the art, no catalyst is typically required when the curable composition contains the triisocyanato triazine compound, although a catalyst may be used, in which event cure will generally occur much more rapidly and at room temperature. Where the tricarbamoyl triazine compound is utilized, however, use of a catalyst is preferred. Typically, the cure catalyst is a metal salt and/or complex of a metal such as lead, zinc, iron, tin, titanium and manganese, preferably tin. Suitable salts of these metals are, for example acetates, octoates, laurates and naphthanates. Suitable complexes, for example, are tetrabutyldiacetoxy stannoxane, dibutyltin dilaurate, dimethyltin dilaurate or an acetyl acetonate.

Quaternary and ternary compounds may also be utilized as catalysts. Generally, the ternary or quaternary catalysts are known compounds of the formulas:

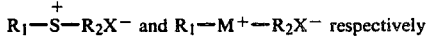

where $R_1$, $R_2$, $R_3$ and $R_4$ may be the same or different and may be $C_1$ to $C_{20}$ aliphatic, aromatic, benzylic, cyclic aliphatic and the like, where M may be nitrogen, phosphorous or arsenic (to provide, respectively, quaternary ammonium, phosphonium or arsonium compounds), where S is sulfur (to provide a ternary sulfonium compound), and where $X^-$ may be hydroxide, alkoxide, bicarbonate, carbonate, formate, acetate lactate, and other carboxylates derived from volatile organic carboxylic acids or the like.

When employed, the cure catalyst is used in the tricarbamoyl triazine curable compositions in amounts effective to accelerate cure at the temperature employed. For example, the catalyst is typically used in amounts of from about 0.01 to about 2.0% by weight, with 0.02 to 1% metal, by weight, for the metal catalysts, based on the weight of the curable compositions, being preferred. When employed in the melamine triisocyanate curable compositions, about 50 to 1000 ppm, based on total curable composition weight, of catalyst is typically used.

In the practice of the invention, the curable compositions can be adapted for use in solvent-based, water-based, and powder coating compositions when the tricarbamoyl triazines are employed, whereas, when the melamine triisocyanate is employed, water-based coating compositions may not be possible. Coating compositions comprising aqueous dispersions are particularly suited to application by electrodeposition. Typically, the compositions will contain about 1 to 90 percent, by weight, of resin and crosslinker combined, and the weight ratio of crosslinker to resin (when used) will range from about 5 to about 50 parts to, correspondingly, from about 50 to 95 parts of said resin. Preferably, depending on the relative equivalent weights of the crosslinker and active hydrogen material, the weight ratios would be from about 15 to 40 parts crosslinker to about 60 to 85 parts resin.

In many instances, a pigment composition and/or various other conventional additives such as antioxidants, surface active agents, coupling agents, flow control additives, and the like, are included. The pigment composition may be of any conventional type, such as iron oxides, lead oxides, strontium chromate, carbon black, titanium dioxide, talc, barium sulfate, cadmium yellow, cadmium red, chromic yellow, or the like.

After application to a substrate, such as a steel panel, the coating composition is cured by any conventional method, such as in baking ovens or with banks of infrared heat lamps.

Conventional methods may also be used to combine the novel triazines herein with fillers and/or reinforcements and to shape them into useful articles by means well known to accomplish these functions with curable isocyanate or blocked isocyanate resins, as the case may be.

DESCRIPTION OF THE PREFERRED EMBODIMENTS

The following examples illustrate the compounds, oligomers, curable compositions and process of the present invention. These examples are not, however, intended to limit the claims in any manner whatsoever.

EXAMPLE 1

Preparation of Melamine Triisocyanate

To a suitable reactor equipped with an efficient reflux condenser and $CaSO_4$ drying tube was charged 2.52 grams of melamine, 60 ml of oxalyl chloride and 60 ml of nitrobenzene and the mixture was brought to reflux with good stirring. The reaction mixture became homogeneous within 72 hours. The excess oxalyl chloride was first removed under slight vacuum at a bath temperature of 80° C. and then the nitrobenzene was removed at less than 1 mm of Hg, allowing the bath to rise to 140° C. The product obtained after stripping was a very light tan, clear semi-solid which showed an intense NCO band in the IR spectrum at 2250 cm$^{-1}$ and also had other expected bands for s-triazine.

EXAMPLE 2

Preparation of the Triisopropylurethane of Melamine Triisocyanate

Six (6) grams of vacuum stripped product of the formula $C_3N_3(NCO)_3$ obtained by reaction of melamine with oxalyl chloride in o-dichlorobenzene is added to 52 grams of isopropanol at room temperature and allowed to stand for 72 hours. The resulting hazy solution is filtered and the filtrate stripped under vacuum yielding 8.33 g of a slightly off-white solid. Infrared spectrum shows complete disappearance of NCO groups and the appearance of a strong urethane band at 1750 cm$^{-1}$. An analytical sample is prepared by recrystallization from methanol. The structure of the recrystallized solid, confirmed by IR, NMR and elemental analysis, is as follows:

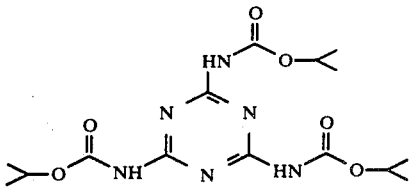

which can be represented by the formula $C_3N_3(NHCOOCH(CH_3)_2)_3$.

The product has a melting range of 223-224° C.

Analysis Calcd: C, 46.87; H, 6.29; N, 21.86. Found: C, 46.01; H, 6.40; N, 21.31.

EXAMPLE 3

Preparation of the Triethylurethane of Melamine Triisocyanate 10.0 g of the vacuum stripped product obtained from the reaction of melamine with oxalyl chloride in dioxane was short path distilled (bulb to bulb) at high vacuum to remove a small amount of polymerized dioxane. 7.67 grams of a light yellow clear oil was obtained which slowly solidified. At room temperature, 3.0 grams of this product was added to 20 ml of absolute ethanol, upon which an exotherm was noted. The resulting hazy solution was filtered and the filtrate stripped under vacuum, yielding 5.2 g of a white solid. The IR showed complete disappearance of NCO groups and the appearance of a strong urethane band at 1750 cm$^{-1}$. This material, after recrystalization from ethanol, gave IR, $^{13}C$, and $^1H$ NMR consistent with the following structure:

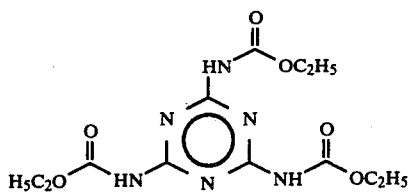

and had a melting point of 216–218° C.

EXAMPLE 4

Preparation of the Triphenylurethane of Melamine Triisocyanate

At room temperature, 4.48 g of the product from Example 1 was added to a pre-dried solution of 5.65 g of phenol in 40 ml of methylene chloride. A slight exotherm was noted upon the addition, and solution was effected within 20 min. After heating on the steam bath for 30 min. and evaporation of solvent under vacuum, a tan oily solid was obtained. Treatment with hexane, followed by filtration, afforded 9.83 grams of a granular solid which showed no NCO groups in the IR and had a urethane band at 1765 cm$^{-1}$. Slightly off-white crystals were obtained by recrystallization from 1,2-dichloroethane. The IR and NMR of this material were consistent with the structure:

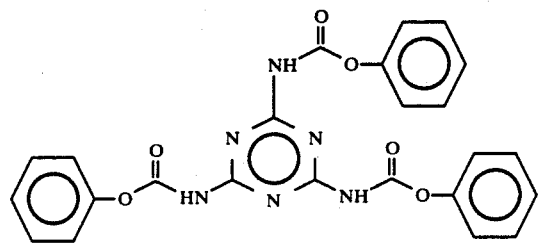

The product had a melting point of 191–195° C.

EXAMPLE 5

Preparation of the Tri-2-Ethylhexylurethane of Melamine Triisocyanate

Following the general procedure of Example 2, but using 2-ethylhexanol in place of isopropanol, a product of the following structure is obtained.

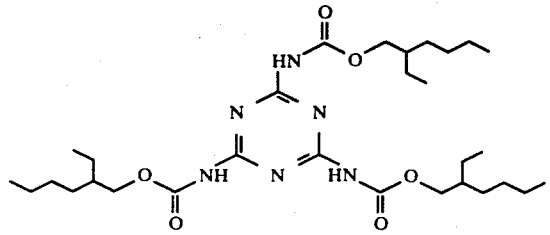

EXAMPLE 6

A hard solvent resistant gel was obtained with the triphenyl urethane of Example 4 by heating with stoichimetric amounts of 1,6-hexanediamine at 10° to 150° C. and allowing phenol to distill during condensation.

EXAMPLE 7

A curable composition is made comprising a hydroxyfunctional acrylic acid and the melamine triisocyanate of Example 1. A copolymer of hydroxyethyl acrylate with other acrylics (G-CURE, 867-RX-60, available from Henkel, Inc.) and the compound of Example 1 at 50 percent non-volatiles in a suitable hydrocarbon solvent, e.g. propylene glycol monomethyl ether acetate (DOWANOL ®, PMA, available from Dow Chemical Company), the —NCO—OH ratio being 1.1/1.0 is treated with 0.05 percent, based on total resin solids, of a tin catalyst, UL-28, and spread on a 1200 S aluminum substrate. The system advances at room temperature to a hard, solvent-resistant film.

EXAMPLE 8

A curable composition is made comprising a hydroxyfunctional polyester and the melamine triisocyanate of Example 1. A hydroxyfunctional polyester (MULTRON ® 221-75, available from Mobay Corp.) and the compound of Example 1 at 60 percent non-volatiles in a hydrocarbon solvent (e.g., DOWANOL ® PMA), the —NCO/—OH ratio being 1.1/1.0, is treated at 0.05 percent (TRS) of a tin catalyst, UL-28, and spread on a 1200 S aluminum substrate. The system advances at room temperature to a hard, solvent resistant film.

EXAMPLE 9

This Example illustrates the use of the tricarbamoyl triazines of the instant invention as crosslinkers for an electrodepositable polymer.

A cationic polymeric material is prepared by reacting EPON 1004 (a product of Shell Chemical Co. comprising the reaction product of bisphenol-A and epichlorohydrin) with the diketimine of diethylenetriamine (prepared as described in U.S. Pat. No. 3,523,925) and diethylamine according to the procedure described in U.S. Pat. No. 3,984,299 for the preparation of the material therein described as adduct C. The disclosures of U.S. Pat. Nos. 3,523,925 and 3,984,299 are incorporated by reference herein. The final cationic resin is 75% solids. A cathodic electrocoating bath is prepared by combining 50 parts, by weight, of the cationic polymeric material, 15 parts, by weight, of the product of Example 5, 1.7 parts of 88% lactic acid, and 1.5 parts of dibutyltindilaurate in a suitable mixing vessel equipped with a Cowels stirrer. These ingredients are rapidly mixed while 466 parts of deionized water is slowly added to produce a bath containing approximately 10% solids. Electrodeposition of the composition on aluminum panels serving as the cathode affords, after curing films having good solvent resistance and mechanical properties.

The above-mentioned patents and publications are incorporated herein by reference. Many variations of this invention will suggest themselves to those skilled in this art in light of the above, detailed description. Instead of using melamine triisocyanate as a curing agent in the formulation of Examples 7, the corresponding tricarbamoyl triazines of Examples 2-5 can be used. Instead of tetrabutyldiacetoxy stannoxane and dibutyltin dilaurate as cure catalysts, lead octoate, stannous octoate or the like may be used. Instead of hydroxyfunctional polyesters and polyacrylates, epoxy resins, such as the polyglycidylethers of bisphenol A and the reaction products thereof with amines and ammonia can be used. All such, and other obvious modifications are within the full intended scope of the appended claims.

What is claimed is:

1. A curable composition comprising:
   (a) a triazine compound selected from
      (i) a triisocyanato triazine compound of the formula $C_3N_3(NC))_3$;
      (ii) a tricarbamyl triazine compound of the formula $C_3N_3(NHCOXR)$;
      (iii) an oligomer of (i) or (ii); or
      (iv) a mixture of at least two of any of (i), (ii) and (iii), wherein the X-R moieties are independently, blocking groups; and optionally
   (b) an active hydrogen-containing material; and further optionally
   (c) a cure catalyst.

2. A curable composition as defined in claim 1 wherein the active hydrogen-containing material is present.

3. A curable composition as defined in claim 2 wherein the active hydrogen-containing material contains at least one class of reactive groups selected from carboxyl groups, alcoholic hydroxy groups, amide groups, amine groups or a mixture of any of such groups or a group convertible to any of such groups.

4. A curable composition as defined in claim 3 wherein the active hydrogen-containing material comprises a hydroxy functional acrylic resin, a low molecular weight polyester polyol, or a polyalkylene polyamine, products of condensation of epoxy resins with amines.

5. A curable composition as defined in claim 4 wherein the active hydrogen-containing material comprises hexamethylene diamine.

6. A curable composition as defined in claim 2 wherein the triazine compound is a triisocyanato triazine compound (i) of the formula $C_3N_3(NCO)_3$.

7. A curable composition as defined in claim 2 wherein, in the triazine compound (ii), R is $C_1$–$C_8$ lower alkyl or phenyl, and X is oxygen.

8. A curable composition as defined in claim 2 wherein the cure catalyst is a metal salt or complex comprising tin.

9. A curable composition as defined in claim 8 wherein the cure catalyst comprises tetrabutyldiacetoxy stannoxane, dibutyltin dilaurate or dimethyltin dilaurate.

10. A substrate protectively coated with a cured composition as defined in claim 1.

11. An article of manufacture comprising a cured composition as defined in claim 2 and a filler.

* * * * *

UNITED STATES PATENT AND TRADEMARK OFFICE
CERTIFICATE OF CORRECTION

PATENT NO. : 4,939,213
DATED : July 3, 1990
INVENTOR(S) : William Jacobs III and Roland DiLeone It is certified that error appears in the above-identified patent and that said Letters Patent is hereby corrected as shown below:

In Column 11, line 7, the formula;

$$C_3N_3(NC))_3$$

is deleted and replaced by the formula;

$$C_3N_3(NCO)_3$$

Signed and Sealed this

Twelfth Day of April, 1994

BRUCE LEHMAN

Attest:

Attesting Officer

Commissioner of Patents and Trademarks